5877X
R. Miller.
Thrashing Mach.
Patented Mar. 15, 1830.
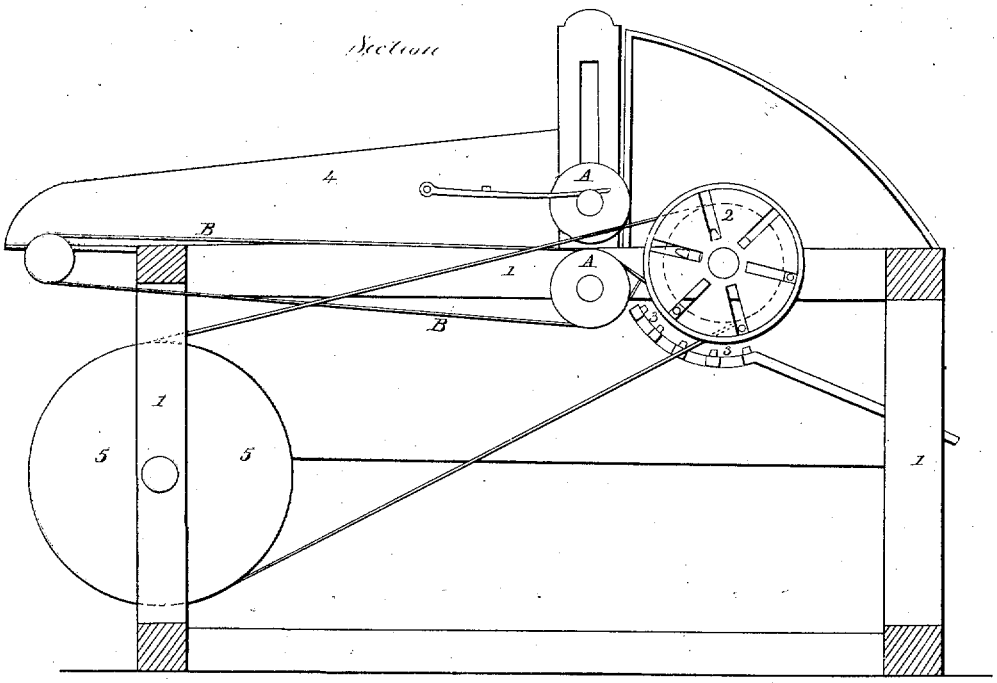

Rudolph Miller
Letters Patent

X5877

The Schedule referred to in these Letters Patent and making part of the same containing a description in the words of the said Rudolph Miller himself of his improvement in the Thrashing Machine.

Be it known that I Rudolph Miller of Marietta Lancaster County Pennsylvania have invented an improvement in the machine for threshing grain which is described as follows. This machine consists of 1st the frame. 2nd the cylinder of beaters. 3 the bed 4th the hopper feeding roller & cloth. 5th the pulleys straps &c for driving the machine. 1st The frame is three feet six inches in length, the side pieces 12 inches wide & under each side piece is a cross piece or girth tenoned into the end posts. The end posts are 2 feet 6 inches high with four end pieces or girths; the two lower ones put in with a tenon & mortice from the bottom & the two upper ones let in with a dove tail from the top. at the hind end & at one side, The girths extend be-yond the frame 9 inches; An upright is framed into the upper & lower girths so as to admit of a multiplying or driving wheel to be placed & run therein. 2nd The cylinder of beaters is made to extend across the frame having two circular wooden heads about 15 inches in diameter & two inches thick fixed one near each end on an iron shaft made to turn in boxes placed on the frame six [illegible] dovetail openings are made in each of these heads to let in the ends of the beaters, which have brass dove tail heads made to slide up & down in said openings. Three of these beaters are rectangular, one & a half inch in diameter & three are one inch by one & a half made of wrought or cast iron, the two front edges are [illegible] the [illegible] beaters are fastened with a square tenon into the dove-[illegible] The rectangular beaters have a round [illegible] prevent them from shifting

X5877 cutting the straw. An iron rim or hoop about one fourth of an inch thick is drawn on each of the two circular heads to confine the beaters in their places & the heads with the beaters form a skeleton drum or cylinder. The dovetail openings in which the beaters are placed admit of their working up & down in such a way that the lower ones fall to the circumference to strike the grain & straw conveyed on the bed (to be hereafter described) or in case of resistance from any hard substance will be pushed up towards the centre, & admit the substance to pass & not injure the machine. 3^d^ the bed is made to correspond with the cylinder of beaters before described being a section of a circle in which is placed square iron bars having an angle at the end of the beater cut down three eighths of an inch thick to a shoulder and they are so placed in the bed as to beat out the grain, but not to cut the straw when struck by the beaters. There is also a lining of wood made sufficiently strong to support the iron bars which form the bed & into which the shoulders of the bars are let in by a mortice. 4^th^ The hopper feeding rollers & cloth are made in the usual way and the latter turned by means of straps, cords, & pulleys connected with the driving pulley & cylinder of beaters. There are also two feeding rollers. the lower one is fixed but the upper one rises and falls having a spring over it for that purpose. 5^th^ The Multiplying wheel or driving pulley is about 30 inches in diameter & three inches thick also another pulley about 8 inches diameter placed on the axle with the cylinder of beaters. The first turns on gudgeons as supported in boxes in the extended girths of the frame before mentioned. A strap passes from the driving pulley to one fixed on the end of the cylinder of beaters & a cord passes from that to the roller that turns the feeding cloth. Operation The sheaves of grain being put into the hopper descend on the feeding ~~cloth~~. The driving pulley being turned by a horse or any other power geared for that purpose brings forward the grain on the feeding cloth & then passes between the feeding rollers to the bars, is struck by the cylinder

X5877 of beaters, the grain separated from the straw falls thro' between the bed & the straw is pushed out. What is here claimed as my peculiar invention is the machine as before described, the cylinder of beaters with the mode in which they are made to rise & fall in their dove tail openings. Also the mode in which the bed is constructed. For a further illustration of my invention I refer to the model and drawing of the same deposited in the Patent Office. In witness whereof I have hereunto subscribed my name at the city of Washington this fifteenth of February 1830

Rudolph Miller

Witnesses
Wm P. Elliot
Robt W. Fenwick

Ex d.
I.S.H.

962 words. 5

(March 15. 1830.)

(drawing [illegible])